US012543238B2

(12) United States Patent
Turtinen et al.

(10) Patent No.: US 12,543,238 B2
(45) Date of Patent: Feb. 3, 2026

(54) BEAM MANAGEMENT FOR SMALL DATA TRANSMISSION

(71) Applicant: Nokia Technologies Oy, Espoo (FI)

(72) Inventors: Samuli Heikki Turtinen, Oulu (FI); Jussi-Pekka Koskinen, Oulu (FI); Chunli Wu, Beijing (CN); Sami-Jukka Hakola, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/926,889

(22) Filed: Oct. 25, 2024

(65) Prior Publication Data

US 2025/0048476 A1   Feb. 6, 2025

Related U.S. Application Data

(63) Continuation of application No. 18/574,146, filed as application No. PCT/CN2021/105463 on Jul. 9, 2021.

(51) Int. Cl.
*H04W 76/20* (2018.01)
*H04B 7/06* (2006.01)
(Continued)

(52) U.S. Cl.
CPC ........ *H04W 76/20* (2018.02); *H04B 7/06964* (2023.05); *H04W 16/28* (2013.01); *H04W 72/1268* (2013.01); *H04W 74/0833* (2013.01)

(58) Field of Classification Search
CPC . H04W 76/20; H04W 16/28; H04W 72/1268; H04W 74/0833; H04W 48/16; H04B 7/06964; H04B 7/06952
See application file for complete search history.

(56) References Cited

U.S. PATENT DOCUMENTS 9,843,974 B1 * 12/2017 Touboul ............ H04W 36/0094
2019/0335376 A1   10/2019 Huang et al.
(Continued)

FOREIGN PATENT DOCUMENTS

CN    109845328 A    6/2019
CN    112543443 A    3/2021
(Continued)

OTHER PUBLICATIONS

Office action received for corresponding Japanese Patent Application No. 2024-500388, dated Jan. 21, 2025, 4 pages of office action and 9 pages of translation/summary available.
(Continued)

*Primary Examiner* — Ayanah S George
(74) *Attorney, Agent, or Firm* — Carter, DeLuca & Farrell LLP

(57) ABSTRACT

Various example embodiments relate to methods and apparatus that support beam management in a small data transmission procedure. A terminal device may comprise at least one processor and at least one memory. The at least one memory includes computer program code stored thereon. The at least one memory and the computer program code may be configured to, with the at least one processor, cause the terminal device to report one or more available beams in a small data transmission procedure, receive a beam switching command to switch a serving beam for the small data transmission procedure, and switch the serving beam for the small data transmission procedure to a target beam indicated in the beam switching command.

2 Claims, 5 Drawing Sheets

(51) Int. Cl.
*H04W 16/28* (2009.01)
*H04W 72/1268* (2023.01)
*H04W 74/0833* (2024.01)

(56) References Cited

U.S. PATENT DOCUMENTS

2022/0039147 A1* 2/2022 Lei .................. H04W 72/046
2024/0155374 A1* 5/2024 Wei .................. H04B 7/0695

FOREIGN PATENT DOCUMENTS

| JP | 2019220982 A | 12/2019 | |
|---|---|---|---|
| WO | 2018/113593 A1 | 6/2018 | |
| WO | 2018/121848 A1 | 7/2018 | |
| WO | 2021/023232 A1 | 2/2021 | |
| WO | WO-2021144096 A1 * | 7/2021 | ......... H04B 7/06964 |

OTHER PUBLICATIONS

"Discussion on RACH based SDT", 3GPP TSG-RAN WG2 Meeting #113 electronic, R2-2100284, Agenda: 8.6.4, OPPO, Jan. 25-Feb. 5, 2021, pp. 1-3.
"Beam Recovery in NR", 3GPP TSG RAN WG1#88, R1-1703168, Agenda: 8.1.2.2.3, Nokia, Feb. 13-17, 2017, 4 pages.
"Discussion on CG-based scheme", 3GPP TSG-RAN WG2 #112-e, R2-2010281, Agenda: 8.6.2, Huawei, Nov. 2-13, 2020, pp. 1-17.
Extended European Search Report received for corresponding European Patent Application No. 21948861.6, dated Feb. 13, 2025, 7 pages.
"CG-based SDT", 3GPP TSG-RAN WG2 #112-e, R2-2009057, Agenda: 8.6.5, Mediatek Inc., Nov. 2-13, 2020, 5 pages.
Non-Final Office action received for corresponding U.S. Appl. No. 18/574,146, dated Feb. 13, 2025, 5 pages.
"Work Item on NR smalldata transmissions in Inactive state", 3GPP TSG RAN Meeting #86, RP-193252, Agenda: 9.1.2, ZTE Corporation, Dec. 9-12, 2019, 4 pages.
"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.
"3rd Generation Partnership Project; Technical Specification Group Radio Access Network; NR; Physical layer procedures for control (Release 16)", 3GPP TS 38.213, V16.5.0, Mar. 2021, pp. 1-183.
International Search Report and Written Opinion received for corresponding Patent Cooperation Treaty Application No. PCT/CN2021/105463, dated Mar. 29, 2022, 9 pages.
"Beam measurement, report, and indication", 3GPP TSG RAN WG1 Meeting 90bis, R1-1717743, Agenda: 7.2.2.3, Spreadtrum Communications, Oct. 9-13, 2017, 5 pages.
Office action received for corresponding Japanese Patent Application No. 2024-500388, dated Sep. 2, 2025, 3 pages of office action and 3 pages of translation/summary available.

* cited by examiner

BEAM MANAGEMENT FOR SMALL DATA TRANSMISSION

This application is a continuation application of a previously filed U.S. utility application Ser. No. 18/574,146 which is incorporated herein by reference.

TECHNICAL FIELD

Various example embodiments described herein generally relate to communication technologies, and more particularly, to methods and apparatus supporting beam management in a small data transmission procedure.

BACKGROUND

Certain abbreviations that may be found in the description and/or in the figures are herewith defined as follows:
BFD Beam Failure Detection
BFI Beam Failure Instance
BFR Beam Failure Recovery
CE Control Element
CG Configured Grant
C-RNTI Cell Radio Network Temporary Identifier
CSI-RS Channel State Information Reference Signal
DCI Downlink Control Information
FR Frequency Range
gNB next Generation Node-B
MAC Medium Access Control
NR New Radio
PBCH Physical Broadcast Channel
PDCCH Physical Downlink Control Channel
PUSCH Physical Uplink Shared Channel
RA Random Access
RRC Radio Resource Control
RSRP Reference Signal Received Power
RSRQ Reference Signal Received Quality
SDT Small Data Transmission
SSB Synchronization Signal Block
UCI Uplink Control Information 5G New Radio (NR) supports a radio resource control inactivate (RRC_INACTIVE) state, and user equipment devices (UEs) with infrequent data transmission are generally maintained by the network in the RRC_INACTIVE state. Compared to the radio resource control idle (RRC_IDLE) state, the RRC_INACTIVE state enables UEs to start transmissions of small or sporadic data with reduced control signaling and a lower initial access delay, which also results in UE power saving. Therefore, the RRC_INACTIVE state is suitable especially for small data transmission such as machine type communication (MTC) applications.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a terminal device is provided. The terminal device may comprise at least one processor and at least one memory. The at least one memory includes computer program code stored thereon. The at least one memory and the computer program code may be configured to, with the at least one processor, cause the terminal device to report one or more available beams in a small data transmission procedure, receive a beam switching command to switch a serving beam for the small data transmission procedure, and switch the serving beam for the small data transmission procedure to a target beam indicated in the beam switching command.

In a second aspect, an example embodiment of a network device is provided. The network device may comprise at least one processor and at least one memory. The at least one memory includes computer program code stored thereon. The at least one memory and the computer program code may be configured to, with the at least one processor, cause the network device to receive from a terminal device a beam measurement report including one or more available beams in a small data transmission procedure, and transmit to the terminal device a beam switching command to switch a serving beam for the small data transmission procedure to a target beam.

In other aspects, example embodiments of methods, apparatus and computer program products that support beam management in the small data transmission procedure are also provided.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein can represent a node B (NodeB or NB), an evolved node B (eNodeB or eNB), or a gNB or an ng-eNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "terminal device" or "user equipment" (UE) refers to any entities or devices that can wirelessly communicate with the network devices or with each other. Examples of the terminal device can include a mobile phone, a mobile terminal, a mobile station, a subscriber station, a portable subscriber station, an access terminal, a computer, a wearable device, an on-vehicle communication device, a machine type communication (MTC) device, a D2D communication device, a V2X communication device, a sensor and the like. The term "terminal device" can be used interchangeably with UE, a user terminal, a mobile terminal, a mobile station, or a wireless device.

Figure 1:
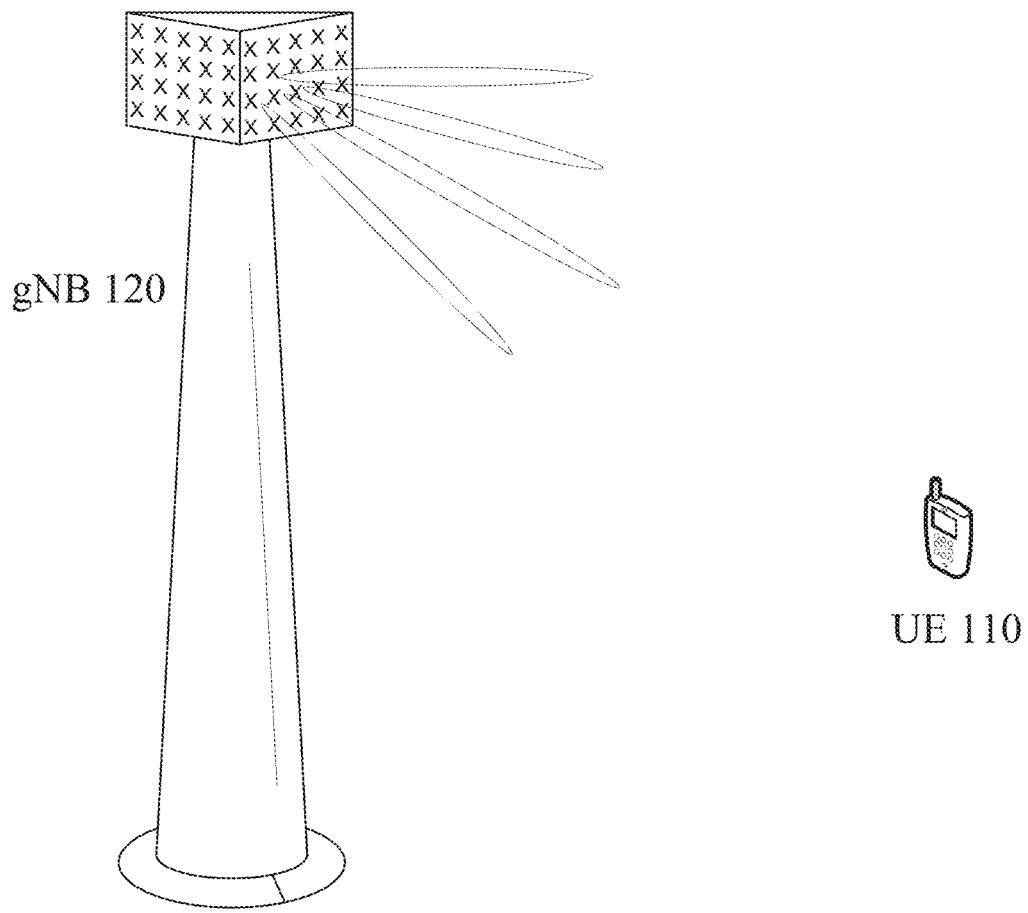
FIG. 1 is a schematic diagram illustrating an example cellular communication network in which embodiments of the present application can be implemented.

FIG. 1 illustrates a schematic diagram of a cellular communication network 100 in which example embodiments of the present disclosure can be implemented. Referring to FIG. 1, the cellular communication network 100, which may be a part of a larger network or system, may include a base station 120 shown as gNB and one or more user equipment (UE) devices 110 (only one is shown) in communication with the gNB 120. The gNB 120 may include a number of antenna elements which are arranged in one or more antenna arrays. The gNB 120 can adjust amplitudes and phase shifts of transmit signals provided to the antenna elements so that signals radiated from the antenna array coherently combine together for a particular transmit direction and destructively cancel each other out for other directions, forming an aggregate transmit signal exhibiting beam-like qualities with more power propagating in the particular direction. This is the so-called beamforming. Beamforming can increase cell coverage and it is suitable especially for the millimeter wave frequency range (FR2) which suffers from a high path loss.

The UE 110 can measure quality of the beams and select a high quality beam to establish a radio resource control (RRC) connection with the gNB 120. Upon the UE 110 goes into the RRC_CONNECTED state, beam management may be applied to ensure beam based communications between the UE 110 and the gNB 120. For example, the UE 110 may periodically measure and report one or more highest quality beams to the gNB 120. When the serving beam falls below a configured reference signal received power (RSRP) threshold or a non-serving beam becomes offset better than the serving beam, the gNB 120 could trigger a beam switching process to replace the serving beam with a better beam.

When the UE 110 does not have frequent or a large volume of data to transmit, the gNB 120 may release the RRC connection and maintain the UE 110 in the RRC_INACTIVE state to save power consumption by sending an RRC release with suspension message to the UE 110. When the UE 110 is in the RRC_INACTIVE state, it can transmit small or sporadic data by a small data transmission (SDT) procedure, which can be performed over a 2-step or 4-step random access (RA) procedure (hereinafter RA-SDT) or using a configured grant (CG) (hereinafter CG-SDT) for example configured grant type 1. For the RA-SDT, an SDT payload may be transmitted in a first message (MsgA) or in a third message (Msg3).

NR will support sending multiple uplink (UL) or downlink (DL) packets in the SDT procedure while not transitioning the UE 110 into the RRC_CONNECTED state in between the multiple packet transmissions. Since the subsequent data session may last long, the serving beam for the SDT procedure may become of poor quality upon UE mobility. Unfortunately, there is no beam management for the SDT procedure or when the UE is in the RRC_INACTIVE state. With no beam management, the SDT session could easily fail upon UE mobility, especially in FR2 or generally higher frequencies.

Hereinafter, various example embodiments of methods and apparatuses supporting beam management in the SDT procedure will be described in detail with reference to the drawings. In the example embodiments, lightweight beam management may be performed for the subsequent SDT procedure to enable beam switching when it is required. The beam management may also include a beam failure recovery procedure to be performed when beam failure is detected for the serving beam of the SDT procedure. The beam management for the SDT procedure helps to ensure successful transmission of multiple packets as parts of the same SDT procedure. With the beam management, the SDT procedure can work well in higher frequency ranges even when it includes multiple packet transmissions and lasts a long period of time.

Figure 2:
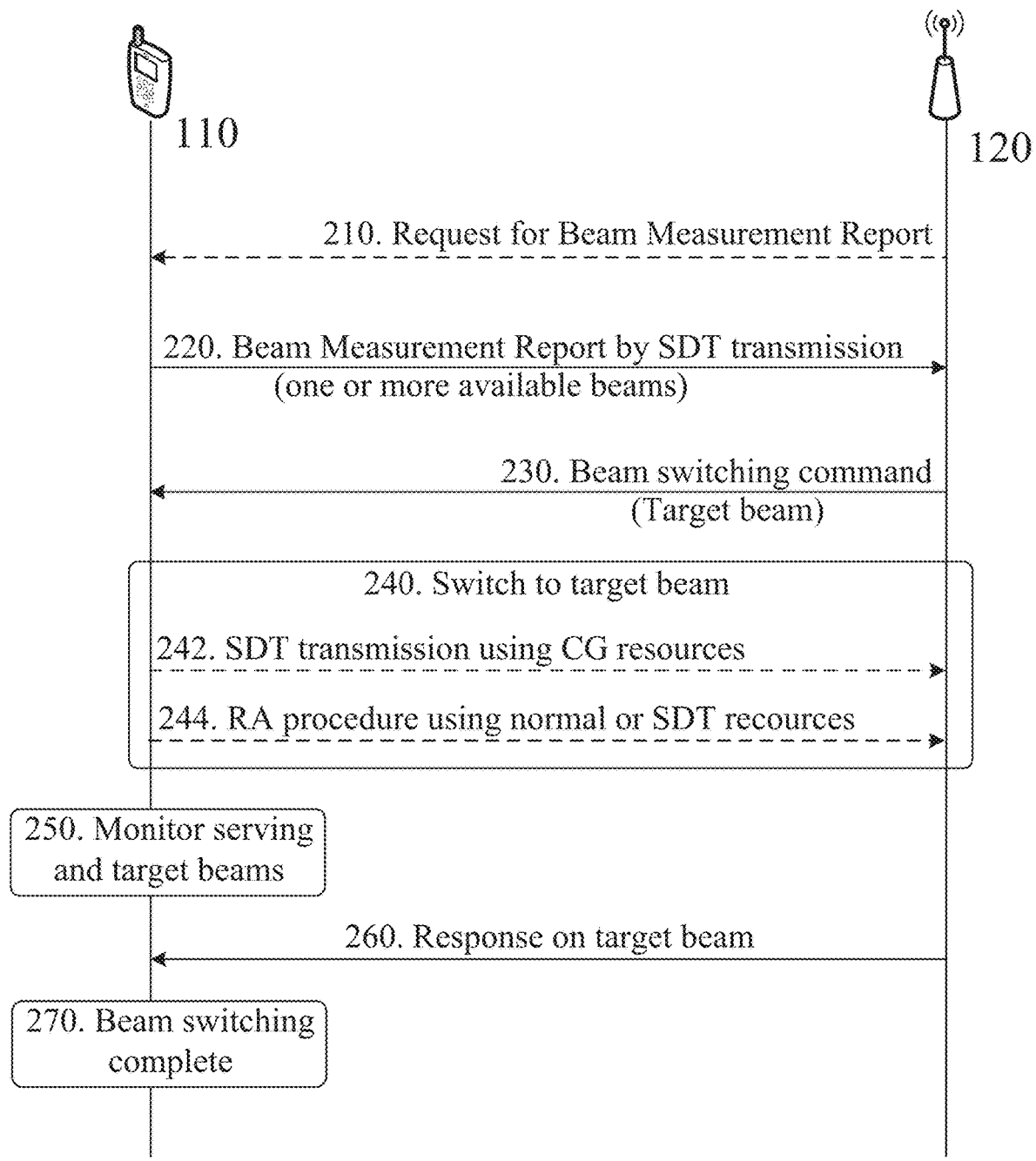
FIG. 2 is a signaling diagram illustrating operations for beam management in a small data transmission procedure according to an example embodiment.

FIG. 2 is a signaling diagram illustrating operations for beam management in an SDT procedure according to an example embodiment. The operations shown in FIG. 2 may be performed by a user equipment device and a base station such as the UE 110 and the gNB 120 described above with respect to FIG. 1. For example, the UE 110 and the gNB 120 may include a plurality of means for performing the operations shown in FIG. 2, and the means may be formed by hardware, software and/or a combination of hardware and software.

Referring to FIG. 2, at 210, the UE 110 may receive a beam measurement report request from the gNB 120. In some example embodiments, the beam measurement report request may be received in downlink control information (DCI) carried on a physical downlink control channel (PDCCH), e.g., DCI for scheduling uplink (UL) transmissions. In some example embodiments, the gNB 120 may transmit the beam measurement report request via dedicated RRC signaling, e.g., in RRCRelease with suspension which is used to transition the UE 110 from the RRC_CONNECTED state to the RRC_INACTIVE state. As another option, the beam measurement report request may be included in a Medium Access Control Control Element (MAC CE).

The beam measurement report request may include beam measurement configuration for the UE 110. For example, the request may configure one or more reference signals for which beam measurement would be performed, one or more measurement related thresholds, and/or a number of beams to be reported to the gNB 120. The beam measurement configuration or at least a part thereof may be carried in a system information block(s) (SIBs) or via RRC signaling e.g., RRCRelease.

At 220, the UE 110 may report one or more available beams in a beam measurement report to the gNB 120 in a small data transmission (SDT) procedure. The reported one or more beams may include one or more strongest beams for the UE 110, and/or beams above a threshold, e.g., a reference signal received power (RSRP) threshold. The RSRP threshold could be the RSRP threshold used to validate a beam for the SDT procedure or a separately configured threshold. The UE 110 may report the available beams responsive to the request received at the operation 210, or in some example embodiments the operation 210 may be omitted and the UE 110 may report the available beams on its own. The number of available beams reported in the operation 220 may be configured by the gNB 120 for example in the operation 210, or it may be a pre-determined number e.g. one.

In some example embodiments, the UE 110 may, when it is in the RRC_INACTIVE state, periodically measure quality of beams in terms of for example reference signal received power (RSRP), reference signal receiving quality (RSRQ) and/or signal to interference plus noise ratio (SINR). The beams may be identified by a reference signal, either a synchronization signal block (SSB) index (time location index) or a channel state information reference signal (CSI-RS) resource index. The SSB measurement may be configured for an initial DL bandwidth part (BWP) or non-initial DL BWPs containing the SSB associated with the initial DL BWP, and the CSI-RS measurement may be configured for the non-initial DL BWPs. The UE 110 may measure DL reference signals explicitly configured by the gNB 120, or the UE 110 may implicitly determine SSBs as DL reference signals when the gNB 120 does not configure the DL reference signals for the UE 110. The UE 110 may measure for example RSRPs of the beams and select strongest beams and/or beams that are above an RSRP threshold for the beam measurement report. An example of the RSRP threshold may be the threshold used to validate a beam for the SDT procedure.

The UE 110 transmits the beam measurement report when an SDT transmission is performed, and it does not trigger any uplink (UL) resource request procedure for the beam measurement report. The beam measurement report may be transmitted alone or together with other UE data in the SDT transmission. The beam measurement report may be transmitted in subsequent SDT transmissions. Here "subsequent" refers to second and later SDT transmissions in the SDT procedure. The UE 110 may not transmit the beam measurement report in the first/initial transmission of the SDT procedure because usually the UE 110 sends the first SDT transmission on the strongest beam by a beam selection procedure. In some example embodiments, the UE 110 may also transmit the beam measurement report in every SDT transmissions including the first transmission and subsequent transmissions. The beam measurement report, or at least information of the one or more available beams, may be transmitted in an MAC CE, in uplink control information (UCI) multiplexed in a physical uplink control channel (PUCCH) or a physical uplink shared channel (PUSCH), or in an RRC message.

In some example embodiments, the UE 110 may trigger the beam measurement report when the serving beam of the SDT procedure falls below a configured RSRP threshold. The serving beam of the SDT procedure is the beam on which the SDT transmission is carried out, and it may be indicated with an RA preamble and random access channel (RACH) resources in the RA-SDT procedure or with CG resources in the CG-SDT procedure. The serving beam of the SDT procedure could also be the beam the UE 110 has been switched to during the SDT procedure, as discussed below. The RSRP threshold may be the RSRP threshold used to validate a beam for the SDT procedure or a separately configured threshold. In some example embodiments, the UE 110 may trigger the beam measurement report when one or more non-serving beams become better than the serving beam by a predetermined offset and/or for a predetermined time period.

In some example embodiments, the UE 110 may consider beams configured with CG resources for SDT transmission as candidates to be reported. The UE 110 would easily perform CG-SDT using the CG resources on such a beam when it switches to the beam. In some example embodiments, the UE 110 may also consider beams without CG resources as candidates to be reported. The UE 110 would perform an RA procedure when it switches to the beam, which will be discussed in detail later.

At 230, the UE 110 may receive a beam switching command to switch the serving beam of the SDT procedure from the gNB 120. For example, when the gNB 120 knows from the beam measurement report that the serving beam of the SDT procedure falls below the configured RSRP threshold or that one or more of the reported non-serving beams become offset better than the serving beam, the gNB 120 may decide to switch the SDT serving beam and send the beam switching command to the UE 110. The beam switching command may indicate a target beam which the UE 110 will switch to, which may be selected from the available beams in the beam measurement report, for example the strongest beam in the beam measurement report. The target beam may or may not have been allocated with CG resources for SDT transmissions. In some example embodiments, the beam switching command may optionally include configuration such as configured uplink grant or dynamic resources scheduled on the target beam for the UE 110.

The beam switching command may be transmitted via an MAC CE, a DCI command or an RRC signaling. The MAC CE may be a newly defined MAC CE or generally reuse a transmission configuration indicator (TCI) state indication for PDCCH MAC CE. The TCI State may indicate to the UE 110 the reception assumption for PDCCH on the target beam. The DCI command for the beam switching command may be the DCI for scheduling UL grant for subsequent SDT transmissions. In an example, the beam switching command may comprise a PDCCH order which will trigger a beam switching process at the UE 110 by an RA procedure using for example an RA preamble allocated for the SDT procedure.

At 240, the UE 110 may switch the serving beam for the SDT procedure to the target beam indicated in the beam switching command. In some example embodiments, the UE 110 may switch the serving beam by sending a subsequent SDT transmission on the target beam to the gNB 120. For example, when the UE 110 has been allocated with CG resources on the target beam, the UE 110 may send the subsequent SDT transmission using the CG resources on the target beam at 242. The gNB 120 can realize from the CG resources that the UE 110 is switching the SDT procedure from the current serving beam to the target beam. In some example embodiments, the UE 110 may also switch the serving beam by an RA procedure at 244. For example, when the UE 110 has not been allocated with CG resources on the target beam, the UE 110 may perform a RA procedure with a C-RNTI MAC CE to indicate to the gNB 120 that the UE 110 is switching to the target beam. The RA procedure may use a preamble and RACH resources allocated for SDT transmission. For example, when the UE 110 has a SDT packet to transmit, the RACH resources for SDT may be used and the SDT packet may be included in MsgA or Msg3 in the RA procedure. On the other hand, the RA procedure may also use a normal preamble and normal RACH resources, i.e. a preamble and RACH resources allocated for non-SDT transmission for example for a connection resume procedure, and the RA procedure does not include an SDT packet in the MsgA or Msg3. The gNB 120 can infer from the received RA message that the UE 110 is switching the SDT procedure from the current serving beam to the target beam and respond to the UE 110 accordingly.

Then at 250, the UE 110 may monitor both the current serving beam and the target beam for DL transmissions. If a DL transmission is received on the target beam, the UE 110 may infer that the gNB 120 has received the transmission on the target beam and confirmed the beam switching by the DL transmission on the target beam. If a DL transmission is received still on the previous serving beam, the UE 110 may infer that the gNB 120 may not have received the SDT transmission on the target beam. The UE 110 may try an UL transmission on the target beam again, or send a new beam measurement report to switch to another beam. In some example embodiments, the UE 110 would not apply the target beam for further subsequent SDT transmissions until it receives a DL transmission on the target beam from the gNB 120.

At 260, the UE 110 may receive a response on the target beam from the gNB 120. In some example embodiments, the response may include a beam switching confirmation or DL data for the UE 110 to confirm the beam switching to the target beam. In some example embodiments, if the UE 110 performed the RA procedure in the operation 240 and the target beam does not have CG resources allocated to the UE 110, the response may further include dynamic or CG resources scheduled on the target beam for the UE 110.

At 270, the beam switching process completes successfully. The UE 110 would use the target beam as the new serving beam for subsequent transmissions in the SDT procedure.

Figure 3:
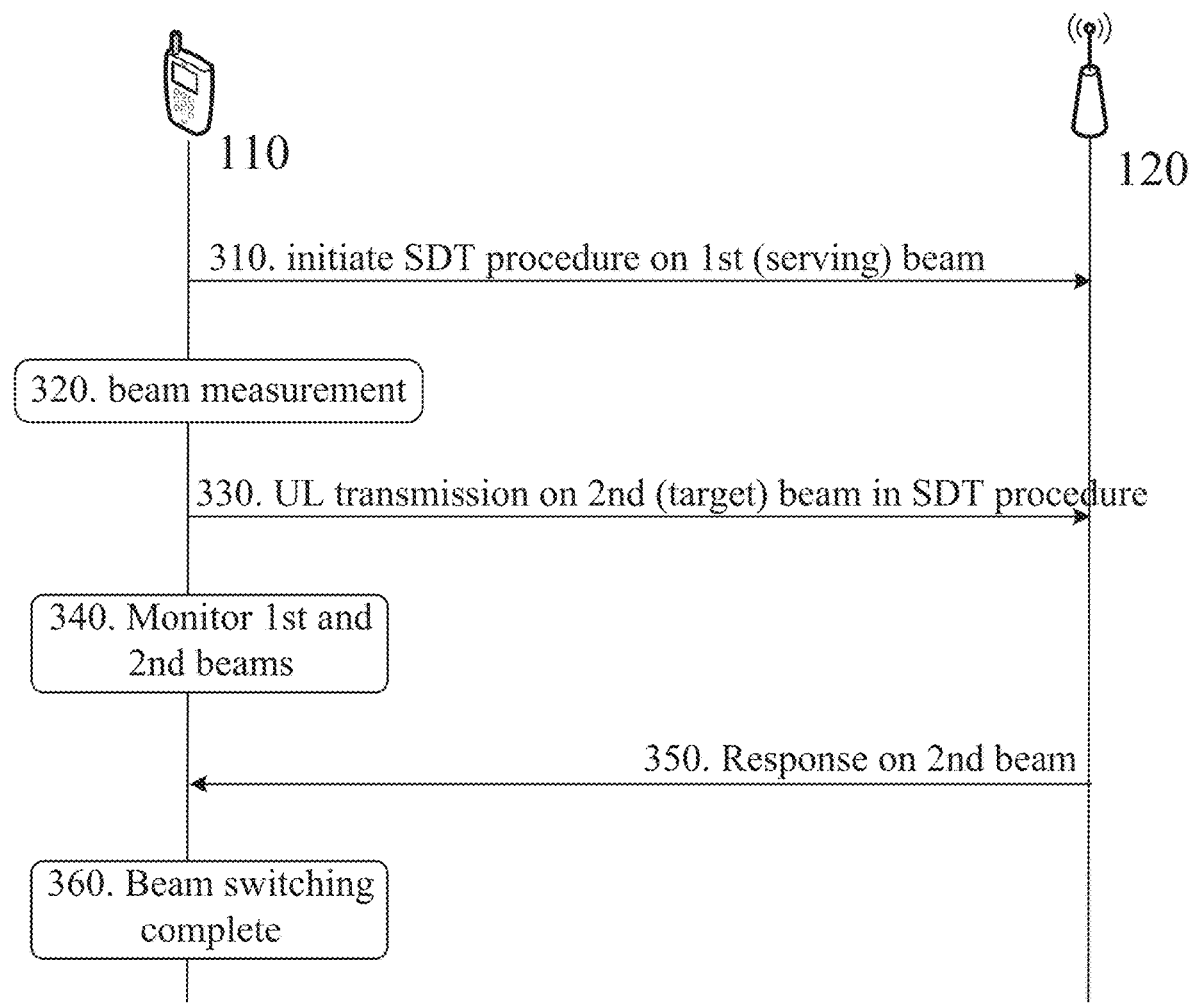
FIG. 3 is a signaling diagram illustrating operations for beam management in a small data transmission procedure according to another example embodiment.

FIG. 3 is a signaling diagram illustrating operations for beam management in the SDT procedure according to another example embodiment. The operations shown in FIG. 3 may be performed by the UE 110 and the gNB 120 described above with respect to FIG. 1. For example, the UE 110 and the gNB 120 may include a plurality of means for performing the operations shown in FIG. 3, and the means may be formed by hardware, software and/or a combination of hardware and software. Some operations shown in FIG. 3 may be similar to those discussed above with reference to FIG. 2 and details thereof will be omitted here.

Unlike the procedure shown in FIG. 2 where the beam switching is initiated by the gNB 120 sending the beam switching command to the UE 110, in the procedure shown in FIG. 3 the beam switching may be initiated at the UE 110 side. Referring to FIG. 3, at 310, the UE 110 may initiate an SDT procedure on a first beam. For example, the UE 110 may select the strongest beam or a beam above a threshold and send a first SDT transmission on the selected beam to the gNB 120. The first/initial SDT transmission may include for example an RRC resume request. The SDT procedure may be performed by an RA-SDT procedure using a preamble and RACH resources allocated for SDT. In the RA-SDT procedure, the SDT packet may be included in MsgA for 2-step RA or in Msg3 for 4-step RA. In some example embodiments, the SDT procedure may be performed by a CG-SDT procedure where the SDT packet is transmitted using CG resources on the first beam. The gNB 120 may identify the first beam by the preamble/PRACH resources or the CG resources used for the first SDT transmission and consider the first beam as the serving beam for the SDT procedure.

In some example embodiments, the UE 110 may also receive a beam measurement report request from the gNB 120 before or after the operation 310, as in the operation 210 shown in FIG. 2.

At 320, the UE 110 may perform beam measurement for available beams including the serving beam of the SDT procedure. Details of the beam measurement have been described above with respect to the operation 220 shown in FIG. 2 and a repetitive description will be omitted here.

At 330, if the beam measurement indicates that the serving beam of the SDT procedure needs to be switched from the first beam to a second/target beam, the UE 110 may switch the serving beam of the SDT procedure to the target beam by for example sending an UL transmission on the target beam in the SDT procedure. For example, when the beam measurement reveals that the serving beam falls below a configured RSRP threshold or the target beam becomes offset better than the serving beam, the UE 110 may decide to switch to the target beam. The target beam may be the strongest beam for the UE 110 or a beam above a threshold at the time of beam measurement.

In some example embodiments, the target beam may have CG resources allocated to the UE 110, and the UE 110 may send a subsequent SDT transmission using the CG resources on the target beam in the operation 330. The gNB 120 may identify the UE 110 and the target beam from the CG resources and infer that the UE 110 is switching the SDT procedure to the target beam. In some example embodiments, the subsequent SDT transmission may also include a beam switching request indicating that the UE 110 is switching the SDT procedure to the target beam. The beam switching request may include an identity of the UE 110. The gNB 120 may determine from the beam switching request that the UE 110 is switching the SDT procedure to the target beam.

In some example embodiments, the target beam may not have CG resources allocated to the UE 110 or the allocated CG resources become unavailable. The UE 110 may send the UL transmission by an RA procedure on the target beam. The RA procedure may include a C-RNTI MAC CE in MsgA or Msg3 to indicate to the gNB 120 that the UE 110 is switching to the target beam. The RA procedure may use a preamble and RACH resources allocated for SDT transmission. For example, when the UE 110 has a SDT packet to transmit, the RACH resources for SDT may be used and the SDT packet may be included in the MsgA or Msg3 of the RA procedure. On the other hand, the RA procedure may also use a normal preamble and normal RACH resources, i.e. a preamble and RACH resources allocated for non-SDT transmission for example for a connection resume procedure, and the RA procedure does not include an SDT packet in the MsgA or Msg3. The gNB 120 can infer from the received RA message that the UE 110 is switching the SDT procedure from the current serving beam to the target beam and respond to the UE 110 accordingly. In some example embodiments, the RA procedure may further include a beam switching request in the MsgA or Msg3 explicitly indicating that the UE 110 is switching the SDT procedure to the target beam. Optionally the beam switching request may also include indication of the first beam used before the beam switching.

At 340, the UE 110 may monitor the first/source beam and the second/target beam until it receives a response on the target beam. Before receiving the response on the target beam, the UE 110 would not apply the target beam for subsequent SDT transmissions.

At 350, the UE 110 may receive a response on the target beam from the gNB 120. The response may include a beam switching confirmation or DL data for the UE 110 to confirm the successful beam switching to the target beam. In some example embodiments, if the UE 110 performed the RA procedure in the operation 330 and the target beam does not have CG resources allocated to the UE 110, the response may further include dynamic or CG resources scheduled on the target beam for the UE 110.

In some example embodiments, if the UE 110 does not receive any response on the target beam from the gNB 120, or if the UE 110 receives a DL transmission still on the first beam from the gNB 120, the UE 110 may infer that the gNB 120 may not have received the UL transmission on the target beam. Then the UE 110 may re-try the UL transmission on the target beam, or it may select a new target beam for the subsequent SDT transmissions according to the latest beam measurement. In some example embodiments, the UE 110 would not apply the target beam for further subsequent SDT transmissions until it receives a response on the target beam from the gNB 120.

At 360, the beam switching process completes successfully. The UE 110 would use the target beam as the new serving beam for subsequent transmissions in the SDT procedure.

Figure 4:
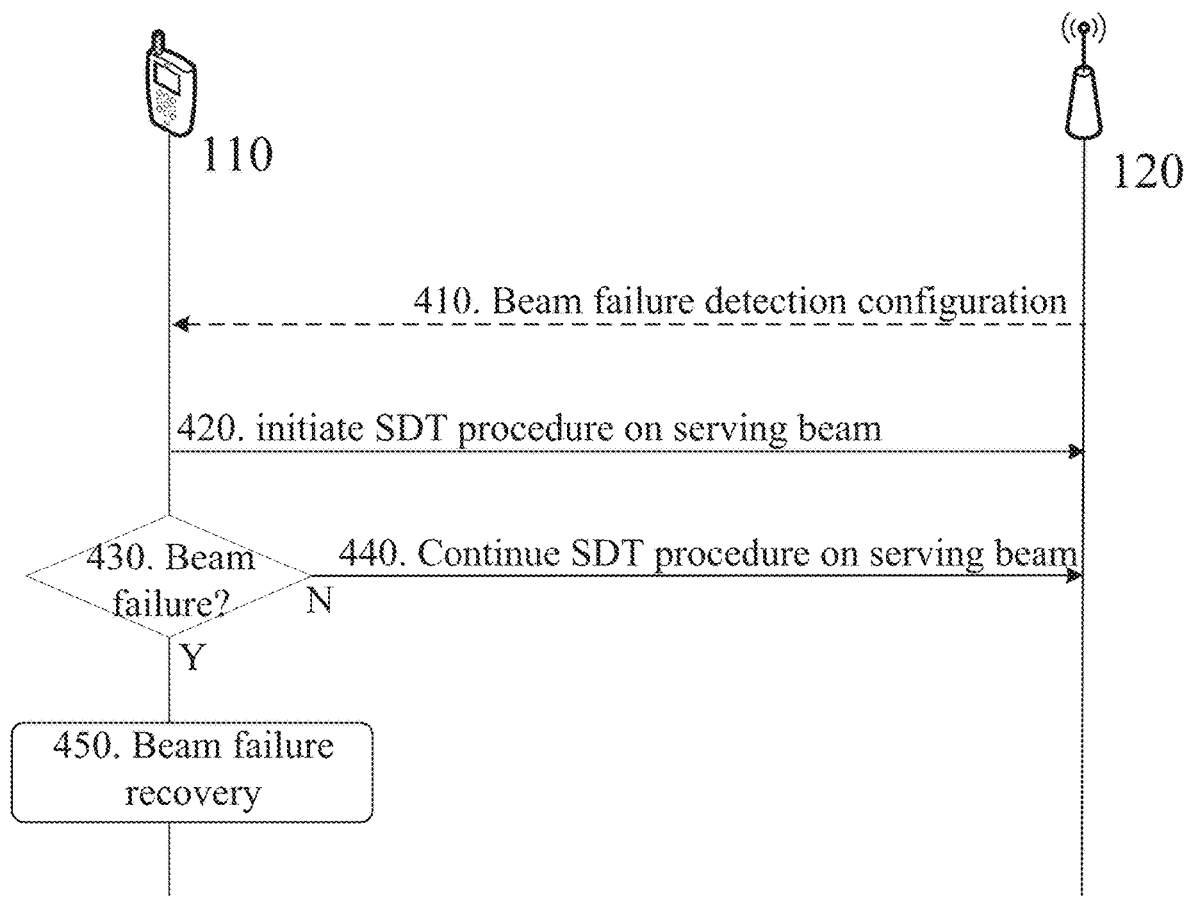
FIG. 4 is a signaling diagram illustrating operations for beam failure detection in a small data transmission procedure according to an example embodiment.

In some cases, the serving beam may become not suitable for data transmission due to for example UE mobility during the SDT procedure, and the UE 110 cannot transmit the beam measurement report on the serving beam to the network to trigger beam switching. The beam management may also include beam failure detection to deal with such cases. FIG. 4 is a signaling diagram illustrating operations for beam failure detection in the SDT procedure according to an example embodiment. The operations shown in FIG. 4 may be performed by the UE 110 and the gNB 120 described above with respect to FIG. 1. For example, the UE 110 and the gNB 120 may include a plurality of means for performing the operations shown in FIG. 4, and the means may be formed by hardware, software and/or a combination of hardware and software. Some operations shown in FIG. 4 may be similar to those discussed above with reference to FIGS. 2-3 and details thereof will be omitted here.

Referring to FIG. 4, at 410, the UE 110 may receive a beam failure detection (BFD) configuration for the SDT procedure from the gNB 120. The BFD configuration for SDT may include parameters for beam failure detection, for example beam failure instance counter and/or timer thresholds. The BFD configuration for SDT may also include an indication of one or more operations to be performed when beam failure is detected. The BFD configuration for SDT may be received via system information broadcast in DCI, via MAC CE, or via RRC signaling e.g. the RRC Release with suspension message. In some example embodiments, the indication of one or more operations to be performed when beam failure is detected may be received when the serving beam for the SDT procedure is detected to be in a failure condition and when the beam failure is triggered e.g. in case of a number of beam failure instances are detected for the serving beam of the SDT procedure. The BFD configuration for SDT may be combined with, included in or independent from the beam measurement report request discussed above in the operation 210 shown in FIG. 2. In some example embodiments, the operation 410 may be omitted and the BFD configuration may be pre-configured at the UE 110.

At 420, the UE 110 may initiate an SDT procedure on a serving beam, for example by selecting a strongest beam or a beam above an RSRP threshold as the serving beam and sending a first/initial SDT transmission on the serving beam. The operation 420 may be similar to the operation 310 discussed above with reference to FIG. 3 and a repetitive description thereof is omitted here.

At 430, the UE 110 may perform beam failure detection for the serving beam during the SDT procedure to determine if the serving beam is in a failure condition. The serving beam may be associated with a beam failure detection reference signal (BFD-RS) quasi co-located with the demodulation reference signal (DMRS) for the PDCCH, and the BFD-RS may be SSB for an initial DL BWP or non-initial DL BWPs containing the SSB associated with the initial DL BWP, or CSI-RS for non-initial DL BWPs. If the UE 110 is not explicitly configured with the BFD-RS, it may implicitly determine SSB as the BFD-RS for the beam failure detection.

The beam failure detection may be done through the physical (PHY) layer assessing quality of the serving beam based on the BFD-RS periodically. In some example embodiments, if the hypothetical PDCCH block error ratio (BLER) estimated using the BFD-RS is above a configured threshold, a beam failure instance (BFI) indication is provided to a higher layer (e.g., the MAC layer). The quality evaluation and BFI indication may be done periodically. The MAC layer may implement a counter to count the BFI indications from the PHY layer. When the BFI counter reaches a maximum value Q, beam failure is detected/declared for the serving beam. The BFI counter can be configured to be supervised by a timer, which is started/restarted each time the MAC layer receives a BFI indication from the PHY layer. Once the timer expires, the BFI counter is reset (counter value is set to zero).

In some example embodiments, the beam failure detection may be implemented in a simpler way. For example, when the hypothetical PDCCH BLER is above a configured threshold or the L1-RSRP is below a configured threshold, the UE 110 may determine that the serving beam is in the failure condition.

If beam failure is not detected at the operation 430, the UE 110 may continue to perform the SDT procedure on the serving beam at 440. For example, the UE 110 may send a beam measurement report on the serving beam as discussed above.

On the other hand, if the UE 110 detects at the operation 430 that the serving beam of the SDT procedure is in a failure condition, a beam failure recovery (BFR) operation may be performed at 450. The BFR operation may be configured by the gNB 120 at the operation 410 or determined by the UE 110 itself. In some example embodiments, the BFR operation may comprise aborting the SDT procedure and triggering an RRC connection establish or re-establishment procedure to go into the RRC_CONNECTED state. For example, the UE 110 may send an RRC Resume request, an RRC setup request or an RRC re-establishment request to the gNB 120. In some example embodiments, the UE 110 may remain in the SDT procedure and re-attempt SDT transmission for a predetermined number of times. If the attempts also fail, the UE 110 may try a different SDT scheme before triggering the RRC connection establish or re-establishment procedure. For example, when the beam failure is detected during a CG-SDT procedure, the UE 110 may abort the CG-SDT procedure and try an RA-SDT procedure. When the beam failure is detected during an RA-SDT procedure, the UE 110 may abort the RA-SDT procedure and try a CG-SDT procedure. In some example embodiments, the UE 110 may indicate a new candidate beam to the gNB 120. For example, the UE 110 may perform the RA procedure on a new candidate beam with a C-RNTI MAC CE included in MsgA or Msg3. The UE 110 may use normal RA resources other than the resources configured for SDT, or the UE 110 may use RA resources allocated for SDT when it has SDT data to transmit. In some example embodiments, the UE 110 may abort the SDT transmission and go into RRC_IDLE or RRC_INACTIVE state.

Figure 5:
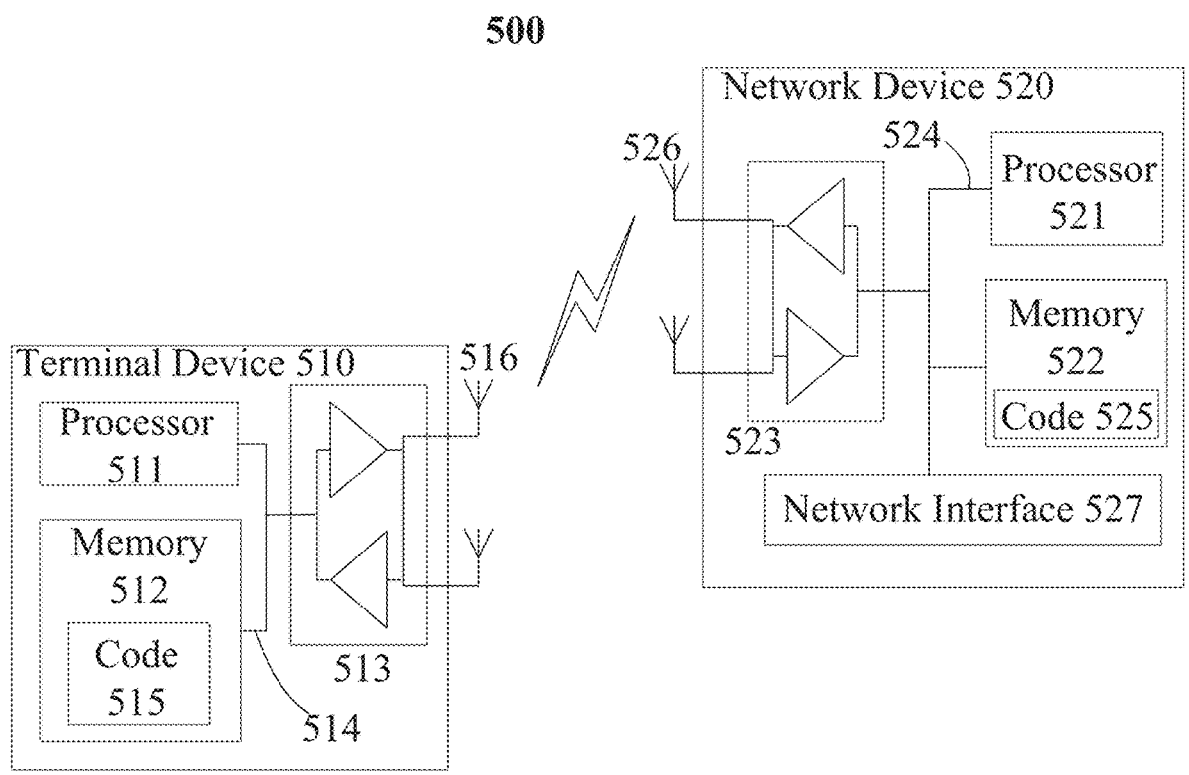
FIG. 5 illustrates a block diagram of a communication system in which example embodiments of the present disclosure can be implemented.

FIG. 5 is a block diagram illustrating a communication system 500 in which example embodiments of the present disclosure can be implemented. The communication system 500 may be a part of a communication network. As shown in FIG. 5, the communication system 500 may include a terminal device 510 which may be implemented as the UE 110 discussed above, a network device 520 which may be implemented as the base station (gNB) 120 discussed above.

Referring to FIG. 5, the terminal device 510 may comprise one or more processors 511, one or more memories 512 and one or more transceivers 513 interconnected through one or more buses 514. The one or more buses 514 may be address, data, or control buses, and may include any interconnection mechanism such as series of lines on a motherboard or integrated circuit, copper cables, optical fibers, or other electrical/optical communication equipment, and the like. Each of the one or more transceivers 513 may comprise a receiver and a transmitter, which are connected to a plurality of antennas 516. The plurality of antennas 516 may form an antenna array to perform beamforming communication with the network device 520. The one or more memories 512 may include computer program code 515. The one or more memories 512 and the computer program code 515 may be configured to, when executed by the one or more processors 511, cause the terminal device 510 to perform procedures and steps relating to the UE 110 as described above.

The network device 520 can be implemented as a single network node, or disaggregated/distributed over two or more network nodes, such as a central unit (CU), a distributed unit (DU), a remote radio head-end (RRH), using different functional-split architectures and different interfaces. The network device 520 may comprise one or more processors 521, one or more memories 522, one or more transceivers 523 and one or more network interfaces 527 interconnected through one or more buses 524. The one or more buses 524 may be address, data, or control buses, and may include any interconnection mechanism such as a series of lines on a motherboard or integrated circuit, copper cables, optical fibers, or other electrical/optical communication equipment, and the like. Each of the one or more transceivers 523 may comprise a receiver and a transmitter, which are connected to a plurality of antennas 526. The network device 520 may operate as a base station for the terminal device 510 and wirelessly communicate with the terminal device 510 through the plurality of antennas 526. The plurality of antennas 526 may form an antenna array to perform beamforming communication with the terminal device 510. The one or more network interfaces 527 may provide wired or wireless communication links through which the network device 520 may communicate with other network devices, entities or functions. The one or more memories 522 may include computer program code 525. The one or more memories 522 and the computer program code 525 may be configured to, when executed by the one or more processors 521, cause the network device 520 to perform procedures and steps relating to the base station (gNB) 120 as described above.

The one or more processors 511, 521 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 511, 521 may be configured to control other elements of the UE/network device and operate in cooperation with them to implement the procedures discussed above.

The one or more memories 512, 522 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 512, 522 may include but not limited to an electric, a magnetic, an optical, an electromagnetic, an infrared, or a semiconductor system, apparatus, or device or any combination of the above.

It would be understood that blocks in the drawings may be implemented in various manners, including software, hardware, firmware, or any combination thereof. In some example embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some example embodiments further provide computer program code or instructions which, when executed by one or more processors, may cause a device or apparatus to perform the procedures described above. The computer program code for carrying out procedures of the example embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some example embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In an example embodiment, a terminal device is provided. The terminal device may comprise at least one processor and at least one memory including computer program code stored thereon. The at least one memory and the computer program code may be configured to, with the at least one processor, cause the terminal device to initiate a small data transmission procedure, and perform beam measurement for available beams including a serving beam for the small data transmission procedure. When the beam measurement indicates that the serving beam for the small data transmission procedure needs to be switched to a target beam, the terminal device sends an uplink transmission on the target beam in the small data transmission procedure.

In an example, the terminal device may send the UL transmission by a small data transmission using configured grant resources on the target beam, or by a random access procedure. The random access procedure may use random access channel resources allocated for small data transmission or normal random access channel resources i.e. resources allocated for non-small data transmission e.g. for a connection resume procedure.

In an example, the UL transmission on the target beam may comprise a beam switching request indicating that the terminal device is switching the small data transmission procedure to the target beam.

In an example, the terminal device may monitor the target beam and the previous serving beam until a response is received on the target beam to confirm the beam switching.

In an example embodiment, a terminal device is provided. The terminal device may comprise at least one processor and at least one memory including computer program code stored thereon. The at least one memory and the computer program code may be configured to, with the at least one processor, cause the terminal device to initiate a small data transmission procedure, perform beam failure detection for a serving beam during the small data transmission procedure, and perform an operation when the serving beam is detected to be in a failure condition.

In an example, the operation performed when the serving beam is detected to be in a failure condition may comprise one or more of triggering a radio resource control connection establishment or re-establishment procedure to go into a connected mode, aborting the small data transmission procedure and going into an idle or inactive mode, re-attempting small data transmission for a predetermined number of times in the small data transmission procedure, or reporting a new candidate beam.

In an example, the terminal device may receive a beam failure detection configuration for the small data transmission procedure. The beam failure detection configuration may indicate to the terminal device the operation performed when the serving beam is detected to be in a failure condition. The beam failure detection configuration may be received over system information broadcast or via a radio resource control signaling.

In an example, the serving beam is associated with a beam failure detection reference signal quasi co-located with a demodulation reference signal for physical downlink control channel carried on the serving beam.

In an example embodiment, a network device is provided. The network device may comprise at least one processor and at least one memory including computer program code stored thereon. The at least one memory and the computer program code may be configured to, with the at least one processor, cause the network device to receive a first small data transmission on a first beam in a small data transmission procedure, receive an uplink transmission on a second beam different from the first beam in the small data transmission procedure, and transmit a response on the second beam to confirm beam switching from the first beam to the second beam for the small data transmission procedure.

In an example, the uplink transmission may be sent by a small data transmission using configured grant resources on the target beam, or by a random access procedure. The random access procedure may use random access channel resources allocated for small data transmission or normal random access channel resources i.e. resources allocated for non-small data transmission e.g. for a connection resume procedure.

In an example, the uplink transmission on the second beam may comprise a beam switching request.

In an example, the response comprises scheduling information for the second beam.

In an example embodiment, a network device is provided. The network device may comprise at least one processor and at least one memory including computer program code stored thereon. The at least one memory and the computer program code may be configured to, with the at least one processor, cause the network device to transmit a beam failure detection configuration for a small data transmission procedure to a terminal device.

In an example, the beam failure detection configuration may indicate an operation to be performed at the terminal device when beam failure is detected in the small data transmission procedure.

In an example, the beam failure detection configuration may be transmitted over system information broadcast or via a radio resource control signaling.

In an example embodiment, a method implemented at a terminal device is provided. The method may comprise initiating a small data transmission procedure, performing beam measurement for available beams including a serving beam for the small data transmission procedure, and sending an uplink transmission on a target beam in the small data transmission procedure when the beam measurement indicates that the serving beam needs to be switched to the target beam.

In an example, the uplink transmission may be sent by a small data transmission using configured grant resources on the target beam, or by a random access procedure. The random access procedure may use random access channel resources allocated for small data transmission or normal random access channel resources i.e. resources allocated for non-small data transmission e.g. for a connection resume procedure.

In an example, the uplink transmission on the target beam may comprise a beam switching request indicating that the terminal device is switching the small data transmission procedure to the target beam.

In an example, the method may further comprise receiving a response on the target beam to confirm the beam switching.

In an example embodiment, a method implemented at a terminal device is provided. The method may comprise initiating a small data transmission procedure, performing beam failure detection for a serving beam during the small data transmission procedure, and performing an operation when the serving beam is detected to be in a failure condition.

In an example, the operation performed when the serving beam is detected to be in a failure condition may comprise one or more of triggering a radio resource control connection establishment or re-establishment procedure to go into a connected mode, aborting the small data transmission procedure and going into an idle or inactive mode, re-attempting small data transmission for a predetermined number of times in the small data transmission procedure, or reporting a new candidate beam.

In an example, the method may further comprise receiving a beam failure detection configuration for the small data transmission procedure. The beam failure detection configuration may indicate to the terminal device the operation performed when the serving beam is detected to be in a failure condition. The beam failure detection configuration may be received over system information broadcast or via a radio resource control signaling.

In an example, the serving beam may be associated with a beam failure detection reference signal quasi co-located with a demodulation reference signal for physical downlink control channel carried on the serving beam.

In an example embodiment, a method implemented at a network device is provided. The method may comprise receiving a first small data transmission on a first beam in a small data transmission procedure, receiving an uplink transmission on a second beam different from the first beam in the small data transmission procedure, and transmitting a response on the second beam to confirm beam switching from the first beam to the second beam for the small data transmission procedure.

In an example, the uplink transmission may be received in a small data transmission using configured grant resources on the target beam, or in a random access procedure. The random access procedure may use random access channel resources allocated for small data transmission or normal random access channel resources i.e. resources allocated for non-small data transmission e.g. for a connection resume procedure.

In an example, the uplink transmission on the target beam may comprise a beam switching request indicating that the terminal device is switching the small data transmission procedure to the target beam.

In an example, the response may comprise scheduling information for the second beam.

In an example embodiment, a method implemented at a network device is provided. The method may comprise transmitting a beam failure detection configuration for a small data transmission procedure to a terminal device.

In an example, the beam failure detection configuration may indicate an operation to be performed at the terminal device when beam failure is detected in the small data transmission procedure.

In an example, the beam failure detection configuration may be transmitted over system information broadcast or via a radio resource control signaling.

In an example embodiment, an apparatus implemented at a terminal device is provided. The apparatus may comprise means for initiating a small data transmission procedure, means for performing beam measurement for available beams including a serving beam for the small data transmission procedure, and means for sending an uplink transmission on a target beam when the beam measurement indicates that the serving beam needs to be switched to the target beam.

In an example embodiment, an apparatus implemented at a terminal device is provided. The apparatus may comprise means for initiating a small data transmission procedure, means for performing beam failure detection for a serving beam during the small data transmission procedure, and means for performing an operation when the serving beam is detected to be in a failure condition.

In an example embodiment, an apparatus implemented at a network device is provided. The apparatus may comprise means for receiving a first small data transmission on a first beam in a small data transmission procedure, means for receiving an uplink transmission on a second beam different from the first beam in the small data transmission procedure, and means for transmitting a response on the second beam to confirm beam switching from the first beam to the second beam for the small data transmission procedure.

In an example embodiment, an apparatus implemented at a network device is provided. The apparatus may comprise means for transmitting a beam failure detection configuration for a small data transmission procedure to a terminal device.

In an example embodiment, a computer program product is provided. The computer program product may comprise instructions stored on a computer readable medium. The instructions, when executed by at least one processor of a terminal device, may cause the terminal device to initiate a small data transmission procedure, perform beam measurement for available beams including a serving beam for the small data transmission procedure, and send an uplink transmission on a target beam when the beam measurement indicates that the serving beam needs to be switched to the target beam.

In an example embodiment, a computer program product is provided. The computer program product may comprise instructions stored on a computer readable medium. The instructions, when executed by at least one processor of a terminal device, may cause the terminal device to initiate a small data transmission procedure, perform beam failure detection for a serving beam during the small data transmission procedure, and perform an operation when the serving beam is detected to be in a failure condition.

In an example embodiment, a computer program product is provided. The computer program product may comprise instructions stored on a computer readable medium. The instructions, when executed by at least one processor of a network device, may cause the network device to receive a first small data transmission on a first beam in a small data transmission procedure, receive an uplink transmission on a second beam different from the first beam in the small data transmission procedure, and transmit a response on the second beam to confirm beam switching from the first beam to the second beam for the small data transmission procedure.

In an example embodiment, a computer program product is provided. The computer program product may comprise instructions stored on a computer readable medium. The instructions, when executed by at least one processor of a network device, may cause the network device to transmit a beam failure detection configuration for a small data transmission procedure to a terminal device.

While operations are depicted in a particular order in the drawings, it should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

The invention claimed is:

1. A terminal device comprising:
   at least one processor; and
   at least one memory including computer program code, the at least one memory and the computer program code configured to, with the at least one processor, cause the terminal device to:
   periodically measure one or more available beams in an inactive state and in a small data transmission (SDT) procedure to provide at least one beam measurement, the one or more available beams comprising a serving beam serving the terminal device in the SDT procedure, and comprising a target beam as one of strongest beams and as a beam above a threshold, the periodically measuring comprising measuring: reference signal received power (RSRP), reference signal receiving quality, and signal to interference plus noise ratio, of the one or more available beams;
   receive a request, from a network, to report the measured one or more available beams, the request configuring: reference signals for which beam measurement would be performed, measurement related thresholds, and a number of beams to be reported;
   trigger, by the terminal device, a beam measurement report based on one or more non-serving beams becoming better than the serving beam by a predetermined offset and for a predetermined time period;
   transmit, in every SDT transmission, terminal device data together with the report of the at least one beam measurement for the measured one or more available beams in the inactive state and in the SDT procedure;
   switch, in the inactive state based on the at least one beam measurement revealing that the serving beam falls below a configured reference signal received power (RSRP) threshold, the serving beam for the SDT procedure to the target beam, wherein the switch comprises performing a random access procedure using a preamble and random access channel resources allocated for small data transmission in the target beam,
   monitor, by the terminal device, both the serving beam and the target beam for downlink transmissions;
   in case a downlink transmission is received on the target beam, infer that the network has received the SDT transmission on the target beam and confirmed the beam switching by the downlink transmission on the target beam, and continue SDT transmissions on the target beam; and
   in case a downlink transmission is received on the serving beam, infer that the network may not have received the SDT transmission on the target beam, and refrain from using the target beam for further SDT transmissions until a downlink transmission on the target beam is received from the network.

2. The terminal device of claim 1, wherein the request to report the measured one or more available beams is included in downlink control information on a physical downlink control channel, in a medium access control control element, or in a radio resource control signaling.

* * * * *